(12) United States Patent
Nakazato

(10) Patent No.: US 8,333,540 B2
(45) Date of Patent: Dec. 18, 2012

(54) CLIP

(75) Inventor: Hiroshi Nakazato, Yokohama (JP)

(73) Assignee: Piolax, Inc., Yokohama-Shi (JP)

( * ) Notice: Subject to any disclaimer, the term of this patent is extended or adjusted under 35 U.S.C. 154(b) by 959 days.

(21) Appl. No.: 12/099,269

(22) Filed: Apr. 8, 2008

(65) Prior Publication Data

US 2009/0252573 A1  Oct. 8, 2009

(51) Int. Cl.
*F16B 19/00* (2006.01)

(52) U.S. Cl. .......................... 411/508; 24/297

(58) Field of Classification Search .................. 411/508, 411/509, 510, 913; 24/289, 297, 453, 457, 24/458
See application file for complete search history.

(56) References Cited

U.S. PATENT DOCUMENTS

| | | | |
|---|---|---|---|
| 3,678,797 A * | 7/1972 | Seckerson | 411/509 |
| 5,319,839 A * | 6/1994 | Shimajiri | 24/453 |
| 5,373,611 A * | 12/1994 | Murata | 24/297 |
| 5,689,863 A * | 11/1997 | Sinozaki | 24/297 |
| 5,704,753 A * | 1/1998 | Ueno | 411/509 |
| 6,572,317 B2 * | 6/2003 | Okada et al. | 411/508 |
| 6,974,292 B2 * | 12/2005 | Hansen | 411/508 |
| 2002/0028123 A1 * | 3/2002 | Miura et al. | 411/508 |
| 2005/0244250 A1 * | 11/2005 | Okada et al. | 411/508 |
| 2008/0052878 A1 * | 3/2008 | Lewis et al. | 24/297 |
| 2008/0298890 A1 * | 12/2008 | Koike | 403/408.1 |
| 2009/0218464 A1 * | 9/2009 | Kato et al. | 248/316.7 |

FOREIGN PATENT DOCUMENTS

| | | |
|---|---|---|
| JP | 4-105615 U | 9/1992 |
| JP | 2002-303309 A | 10/2002 |
| JP | 3560061 B2 | 10/2002 |
| JP | 2005-315369 A | 11/2005 |
| JP | 2006-077827 A | 3/2006 |

OTHER PUBLICATIONS

Japanese Office Action dated Aug. 24, 2010 (and English translation thereof) in counterpart Japanese Application No. 2006-295371.

* cited by examiner

*Primary Examiner* — Gary Estremsky
(74) *Attorney, Agent, or Firm* — Holtz, Holtz, Goodman & Chick, PC

(57) ABSTRACT

A clip has a head portion and a locking leg. The locking leg includes a shaft portion vertically extending from the head portion and a plurality of elastic locking legs which are arranged at given intervals at the outer periphery of the shaft portion. Upper ends of the elastic locking legs are connected to the lower surface of the head portion, and each of the elastic locking legs has two portions on two sides, respectively, of a lower end connected to connection ribs extending from the shaft portion. The outer periphery of the shaft portion except for the connection ribs is arranged within an inner side of an inner periphery of the elastic locking members, such that the locking leg can pass through a mounting hole of a panel without the outer periphery of the shaft portion contacting the inner periphery of the elastic locking members.

12 Claims, 11 Drawing Sheets

CLIP

BACKGROUND OF THE INVENTION

1. Field of the Invention

The present invention relates to a clip used to fix a component, such as an automotive interior component, to a mounting hole of a vehicle body panel or the like.

2. Description of the Related Art

Conventionally, a clip of this type has been used which has a head portion to be fixed to a component and a locking leg extending from the head portion, with the locking leg being inserted into a mounting hole of a vehicle body panel or the like for fixation.

For example, Japanese Utility Model Application Laid-Open No. Hei 4-105615 discloses a clip which is equipped with a head portion and a leg portion. The leg portion is to be inserted into a hole of a panel of a vehicle body or the like to be thereby locked thereto, and includes four legs which independently extend from the head portion. Each leg is integrally molded so as to have an intermediate portion expanding radially outwards and to form a tapered leg portion at its end. Further, the legs are of the same sectional configuration around the intermediate portions thereof and are symmetrically arranged at equal intervals with respect to the central axis of the leg portion.

JP 3560061 B discloses a synthetic resin fastener which has a head portion and a locking leg extending from the lower surface of the head portion and which is to be immovably mounted to a panel by forcing the locking leg into a through-hole of the panel. The locking leg includes a shaft core portion and a plurality of elastic locking members. The shaft core portion extends straight from the lower surface of the head portion and has three or four protrusions protruding outwardly from the center thereof, the protrusions being arranged at requisite intervals. An imaginary shaft diameter as defined by the outermost peripheral portions of the protrusions does not exceed the diameter of the through-hole of the panel. The plurality of elastic locking members are arranged between the protrusions of the shaft core portion and maintain requisite intervals between themselves and the protrusions. The elastic locking members have upper end portions which are bonded to a base portion of the shaft core portion or the lower surface of the head portion, lower end portions which are bonded to the leg end of the shaft core portion, and intermediate portions which are separated from the shaft core portion to provide gaps and have on the outer side thereof swelling portions of a size exceeding the diameter of the through-hole of the panel. When locking the fastener to the through-hole of the panel, the elastic locking members are reduced in diameter as the shaft core portion is forced into the through-hole to thereby hook the swelling portions onto the edge of the through-hole of the panel.

Further, JP 2005-315369 A discloses a resin clip which has a head portion to be held in contact with the peripheral edge of a mounting hole of a mounting panel and a leg portion extending from the head portion to be inserted into the mounting hole and adapted to be engaged with the peripheral edge on the back side of the mounting hole. The leg portion has a shaft portion vertically extending from the center of the lower surface of the head portion, at least three protrusions which extend radially from the shaft portion and whose upper ends are connected to the lower surface of the head portion, and engagement members which extend circumferentially from the protrusions to be arranged between the protrusions. The engagement members have upper ends which are connected to the head portion, end portions in the circumferential extending direction which define predetermined slits between themselves and opposing protrusions, and exclusively lower end portions which are connected to the opposing protrusions. The outer diameter of the engagement members is larger than the inner diameter of the mounting hole.

In the clip disclosed in Japanese Utility Model Application Laid-Open No. Hei 4-105615, the leg portion includes four legs (elastic locking members) independently extending from the head portion, so no shaft portion exists at the center of the elastic locking members. When the position of the mounting hole is deviated due to dimensional deviation between components, and the leg portion has to be obliquely inserted into the mounting hole, buckling may be caused to make the insertion impossible or breakage may be caused.

In the clip disclosed in JP 3560061 B, the protrusions outwardly protruding from the center of the shaft core portion are situated between the elastic locking members, and, while the locking leg is being inserted into the mounting hole, the protrusions abut the inner periphery of the mounting hole to perform positioning on the center of the locking leg with respect to the mounting hole. However, when there is a considerable dimensional deviation between the mounting holes, and the leg portion has to be inserted into the mounting hole obliquely at a considerably large angle with respect thereto, the insertion is effected with the protrusions being scraped by the inner periphery of the mounting hole. Thus, there arises a problem in that the insertion resistance for the locking leg increases.

Further, in the clip disclosed in JP 2005-315369 A, one side of each engagement member is connected to a protrusion radially extending from the shaft portion, so there is a difference in deflection rigidity, toward the inside, between the side edge connected to the protrusion of the engagement member and the side edge spaced apart from the shaft portion. Thus, it is difficult to obtain a deflection rigidity uniform over the entire periphery, and when a large lateral external force is applied to the leg portion in the mounted state, the engagement members undergo great deformation depending upon the direction and the clip may become subject to detachment.

SUMMARY OF THE INVENTION

It is accordingly an object of the present invention to provide a clip which involves no buckling when the position of a mounting hole is deviated at the time of insertion of the locking leg into the mounting hole, and which allows insertion locking without involving a great increase in insertion resistance, which makes it possible to obtain a substantially uniform deflection rigidity over the entire periphery if a lateral external force is applied to the leg portion in the mounted state.

In order to attain the above object, a first aspect of the present invention provides a clip formed of synthetic resin including: a head portion; and a locking leg vertically extending from a lower surface of the head portion, the clip being capable of being immovably mounted to a panel by inserting the locking leg into a mounting hole of the panel, in which the locking leg includes: a shaft portion vertically extending from the center of the lower surface of the head portion; and at least three elastic locking members arranged at given intervals in an outer periphery of the shaft portion, each having an upper end thereof connected to the lower surface of the head portion and two portions on both sides of a lower end thereof connected to the shaft portion, and in which the outer periphery of the shaft portion excepting portions connected to the elastic locking members is situated on an inner side of an inner periphery of the elastic locking members, such that the locking leg can pass through the mounting hole of the panel without coming into contact at the inner periphery of the elastic locking members with the outer periphery of the shaft portion.

According to the above aspect of the present invention, the locking leg has the shaft portion vertically extending from the center of the lower surface of the head portion, and at least three elastic locking members arranged in the outer periphery of this shaft portion at given intervals, so even when the position of the mounting hole is deviated due to dimensional deviation between components, and the locking leg has to be obliquely inserted into the mounting hole, it is possible to avoid buckling or breakage of the elastic locking members due to the shaft portion. Further, the outer periphery of the shaft portion excepting connection ribs are situated on the inner side of the inner periphery of the elastic locking members, and when the locking leg is inserted into the mounting hole, the inner periphery of the elastic locking members does not abut the outer periphery of the shaft portion, so the shaft portion as well as the elastic locking members are not scraped by the inner periphery of the mounting hole, and there is involved no excessive increase in insertion resistance. Further, the upper ends of the elastic locking members are connected to the lower surface of the head portion, and two portions on both sides of the lower end of each elastic locking member are connected to the shaft portion, so it is possible to obtain a substantially uniform deflection rigidity over the entire periphery.

A second aspect of the present invention provides a clip according to the first aspect, in which the two portions on both sides of the lower end of each of the elastic locking members are connected to the shaft portion via connection ribs extending from the shaft portion.

According to the above aspect of the present invention, the two portions on both sides of the lower end of each elastic locking member are connected to the shaft portion via the connection ribs extending from the shaft portion, so no deterioration in flexibility is involved, while an appropriate rigidity is maintained, making it possible to achieve a relatively small insertion resistance at the time of insertion of the locking leg into the mounting hole and attain a satisfactory insertion workability.

A third aspect of the present invention provides a clip according to the second aspect, in which the shaft portion has protrusions extending along an axial direction, the protrusions being situated on the position substantially between the elastic locking members, in which upper ends of the protrusions are connected to the lower surface of the head portion, in which lower ends of the protrusions constitute the connection ribs, and in which an outer periphery of the protrusions excepting the connection ribs is situated on the inner side of the inner periphery of the elastic locking members.

According to the above aspect of the present invention, the shaft portion is equipped with protrusions extending along an axial direction, whereby it is possible to enhance the rigidity of the shaft portion and to enhance the insertion guiding property for the insertion into the mounting hole. Further, the outer periphery of the protrusions excepting the connection ribs is situated on the inner side of the inner periphery of the elastic locking members, so even when it is necessary to obliquely insert the locking leg into the mounting hole, the protrusions do not abut the inner periphery of the mounting hole to thereby be scraped, and no excessive increase in insertion resistance is involved.

A fourth aspect of the present invention provides a clip according to the third aspect, in which the elastic locking members include four elastic locking members arranged at an interval of approximately 90 degrees with respect to the shaft portion, in which, of the four elastic locking members, a pair of the elastic locking members opposed to each other are wider and thinner than another pair of the elastic locking members opposed to each other, and in which each pair of the protrusions extending toward both sides of each of the wider elastic locking members make an acute angle.

According to the above aspect of the present invention, the pair of protrusions extending toward both sides of the wider elastic locking member make an acute angle, so when the elastic locking member is deflected greatly inwards, the elastic locking member would reach the forward ends of the protrusions. However, since the wider elastic locking member is formed thin, it is possible to secure a sufficient margin for the deflection. On the other hand, when it is greatly deflected inwards, the wider elastic locking member actually abuts the forward ends of the protrusions. Therefore, in the mounted state, even when there is exerted to the locking leg a large external force to deflect the wider elastic locking member, the inner periphery of the elastic locking member abuts the protrusions, and further deflection thereof is restrained, whereby it is possible to prevent the situation such as a damage of the elastic locking member, a detachment of the clip due to extreme deformation, and the like.

On the other hand, the narrower elastic locking member is formed relatively thick, so it is rather difficult to secure a margin for deflection toward the inside. However, the pair of protrusions extending toward both sides of the narrower elastic locking member make an obtuse angle, so when the narrower elastic locking member is deflected inwardly, it does not interfere with the protrusions, and can be deflected greatly, thus making it possible to secure a sufficient margin for deflection. Further, since it is formed thicker as compared with the wider elastic locking member, it is possible to substantially equalize the rigidity of the wider elastic locking member with that of the narrower elastic locking member, thereby making it possible to provide a substantially uniform deflection rigidity over the entire periphery of the clip.

A fifth aspect of the present invention provides a clip according to the fourth aspect, in which an outer periphery of a lower end portion of the locking leg includes four cavities defined by the elastic locking members, the connection ribs, and the shaft portion, and in which, of the four cavities, cavities situated in the lower side of the wider elastic locking members are narrower and more elongated upwardly than cavities situated in the lower side of the narrower elastic locking members.

According to the above aspect of the present invention, of the four cavities formed in the outer periphery of the lower end portion of the locking leg and defined by the elastic locking members, the connection ribs, and the shaft portion, the cavities situated in the lower side of the wider elastic locking members are narrower and extend farther upwards than those situated in the lower side of the narrower elastic locking members, whereby the flexibility of the portion between the connecting portions on both sides of the lower ends of the narrower elastic locking members and the flexibility of the portion between the connecting portions on both sides of the lower ends of the wider elastic locking members are balanced to make even, thereby attaining a more uniform deflection rigidity over the entire periphery of the locking leg at the connection portions.

A sixth aspect of the present invention provides a clip according to the fourth aspect or the fifth aspect, in which the shaft portion includes a rib-like protrusion to restrain excessive deflection of the protrusions, the rib-like protrusion being situated between the pair of the protrusions of the shaft portion extending toward the narrower elastic locking members.

According to the above aspects of the present invention, even when, in the mounted state, there is exerted on the locking leg a large external force to deflect the narrower elastic locking members, the inner periphery of the elastic locking members abut the rib-like protrusion, and further deflection thereof is restrained, so it is possible to avoid the situation such as a damage of the elastic locking members, a detachment of the clip due to excessive deformation, and the like.

A seventh aspect of the present invention provides a clip according to any one of the first aspect through the sixth aspect, in which each of the elastic locking members includes an upper end portion gradually reduced in width and connected to the lower surface of the head portion.

According to the above aspects of the present invention, the upper end portions of the elastic locking members are gradually reduced in width and connected to the lower surface of the head portion. Therefore, when an external force is exerted on the elastic locking members, not only are the elastic locking members deflected inwardly, but the elastic locking members tend to be twisted at their narrowed upper end portions, so that the elastic locking members can be deflected in conformity with the inner periphery of the mounting hole, making it possible to maintain the requisite engagement force with respect to the mounting hole.

According to the clip of the present invention, even when the position of the mounting hole is deviated due to inter-component dimensional deviation, and the locking leg has to be inserted obliquely into the mounting hole, buckling or damage of the elastic locking members is prevented due to the shaft portion. Further, the shaft portion as well as the elastic locking members are not scraped by the inner periphery of the mounting hole, and no excessive increase in insertion resistance is involved. Further, the upper ends of the elastic locking members are connected to the lower surface of the head portion, and two portions on both sides of the lower end portion of each of the elastic locking members are connected to the connection ribs extending from the shaft portion, so the clip exhibits an appropriate rigidity without impairing its flexibility. Thus, it is possible to maintain a relatively low insertion resistance when inserting the locking leg into the mounting hole, thus attaining a satisfactory insertion workability.

DETAILED DESCRIPTION OF THE PREFERRED EMBODIMENTS

Next, a clip according to an embodiment of the present invention will be described with reference to FIGS. 1 through 14.

Figure 1:
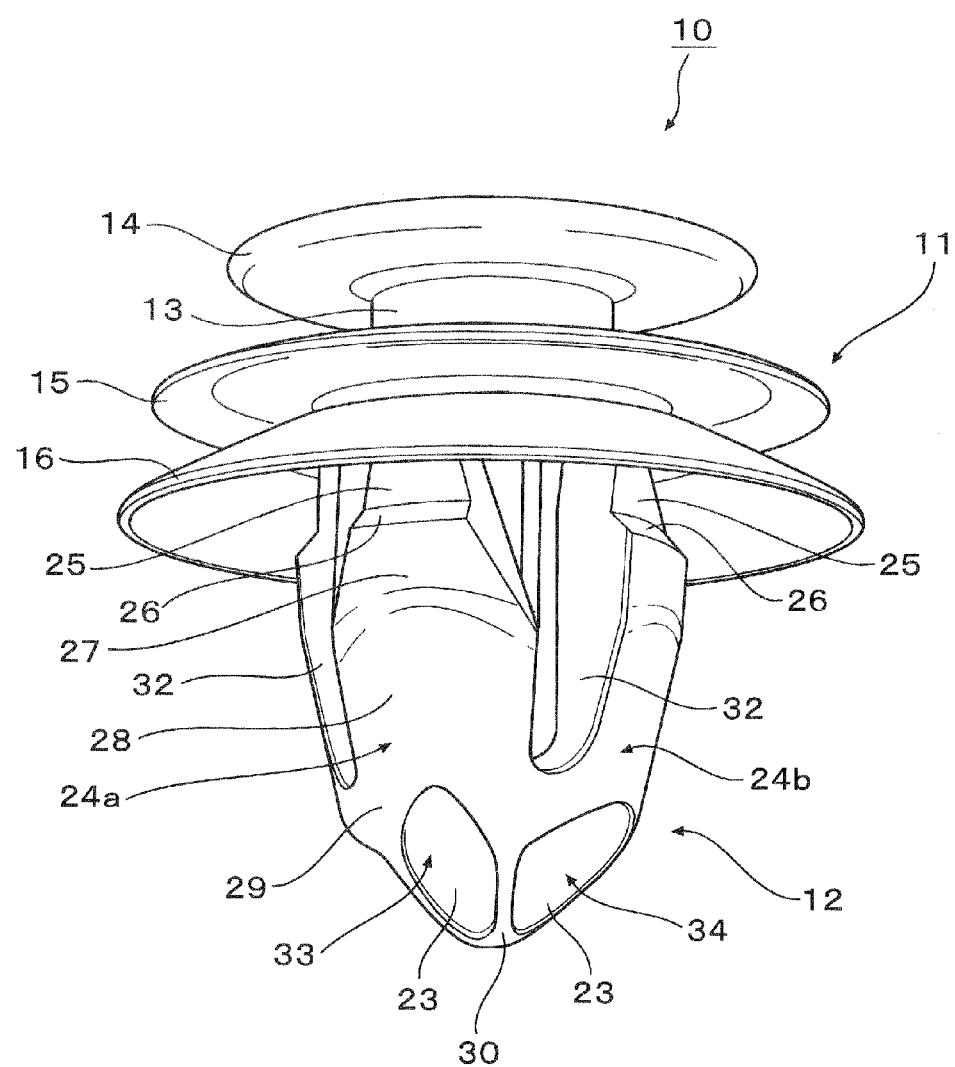
FIG. 1 is a perspective view of a clip according to an embodiment of the present invention.
Figure 6:
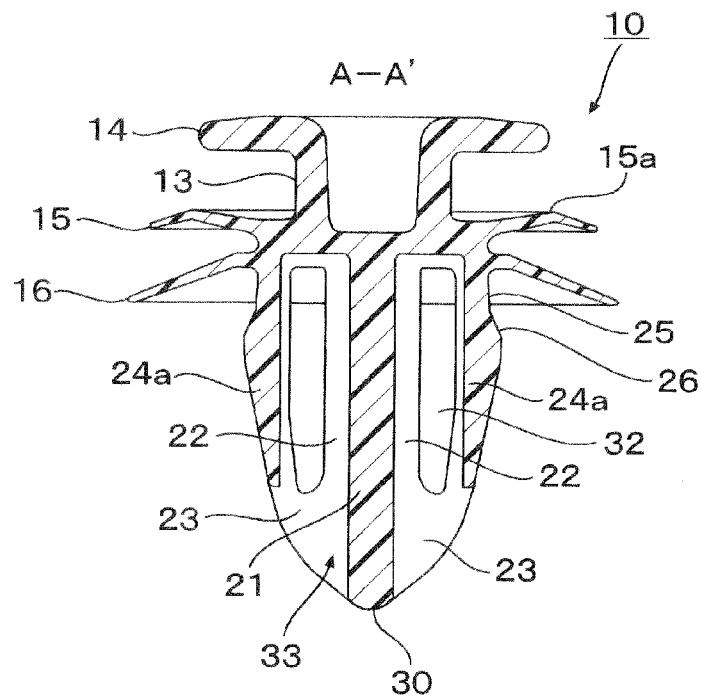
FIG. 6 is a sectional view taken along the arrow line A-A' of FIG. 4.

As shown in FIG. 1, this clip, indicated by reference numeral 10, includes a head portion 11 and a locking leg 12. The head portion 11 has a base portion 13 formed as a bottomed cylinder, a first flange portion 14 formed in the outer periphery of the upper end of the base portion 13, a second flange portion 15 formed in the outer periphery of an intermediate portion of the base portion 13, and a seal flange portion 16 formed in the outer periphery of the lower end portion of the base portion 13. As shown in FIG. 6, the second flange portion 15 has an annular protrusion 15a which is upwardly curved.

Figure 11:
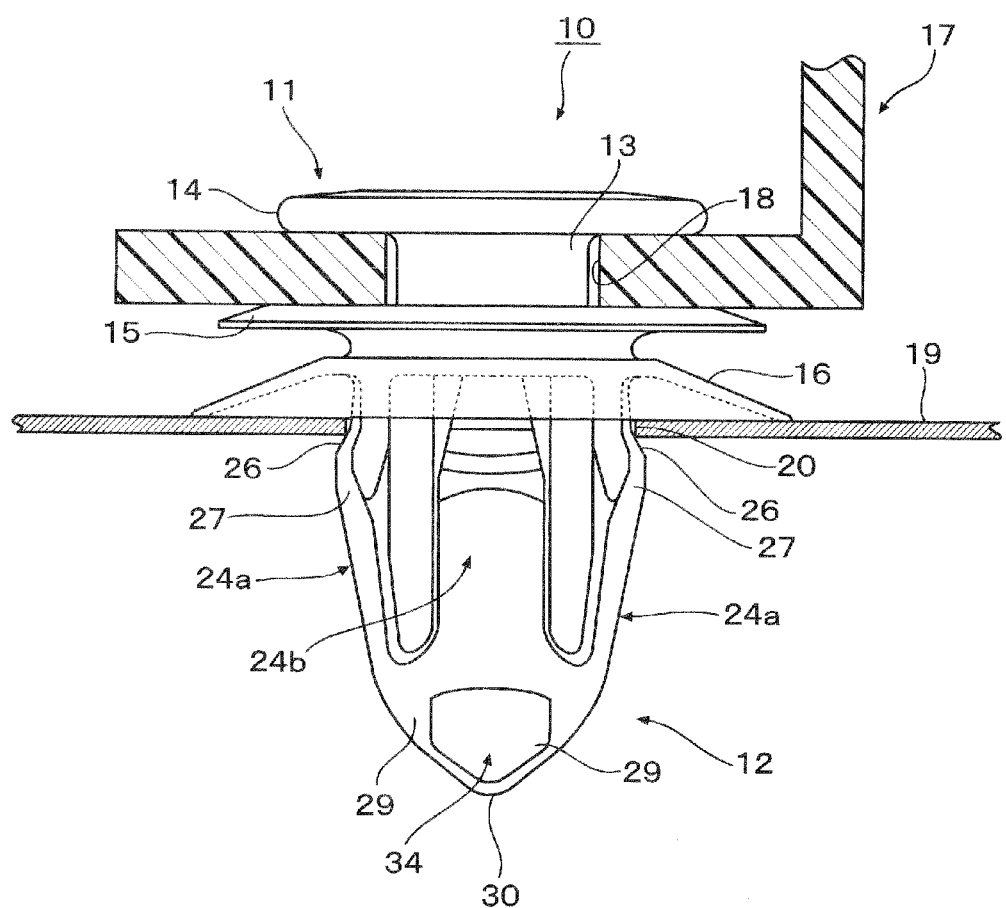
FIG. 11 is a sectional view showing how a mounting member is fixed to a mounting hole of a mounting panel by using the clip.

As shown in FIG. 11, the clip 10 is previously fixed to a mounting member 17 by being fit-engaged with an engagement groove 18 of the mounting member 17, with the peripheral edge of the engagement groove 18 being held between the first flange portion 14 and the second flange portion 15.

The peripheral edge of the seal flange portion 16 extends obliquely downwards in a skirt-like fashion, and is held in contact with the upper surface of a mounting panel 19, thus also serving to seal a mounting hole 20. The mounting member 17 may include, for example, an automotive door trim, and the mounting panel 19 may include, for example, a body panel.

Figure 7:
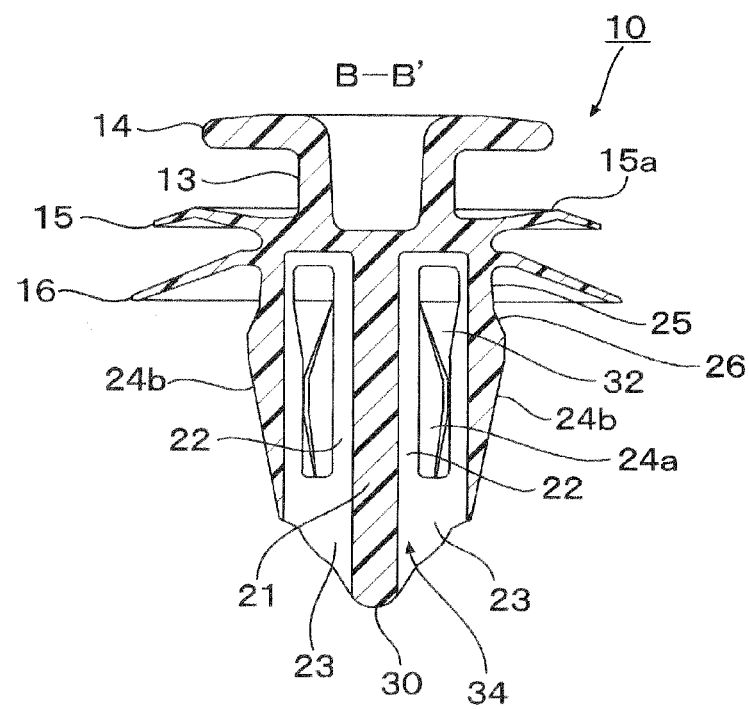
FIG. 7 is a sectional view taken along the arrow line B-B' of FIG. 4.
Figure 8:
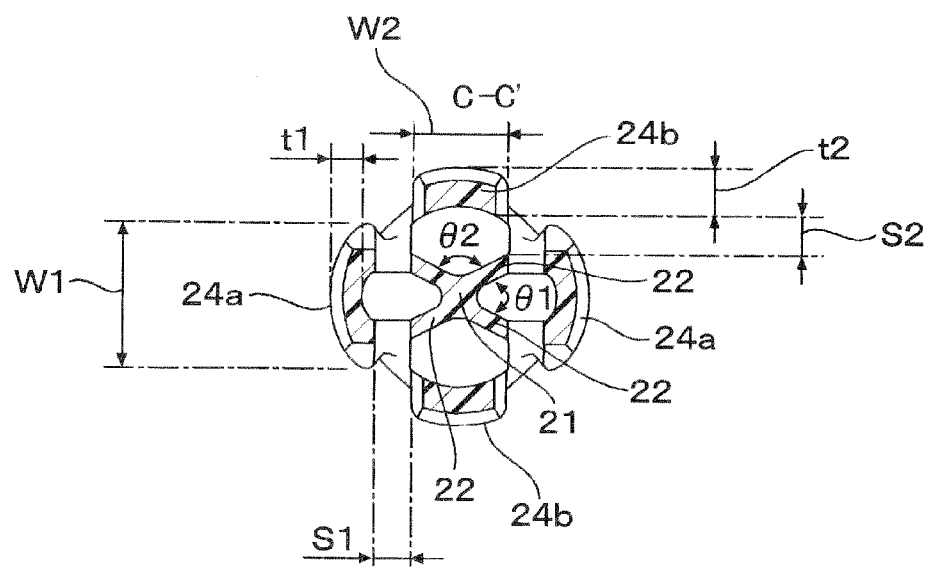
FIG. 8 is a sectional view taken along the arrow line C-C' of FIG. 2.

Referring to FIGS. 6, 7, and 8, the locking leg 12 has a shaft portion 21 vertically extending from the center of the lower surface of the head portion 11. Four protrusions 22 extend radially outwards from the shaft portion 21. The protrusions 22 extend in the axial direction of the shaft portion 21. Their upper ends are connected to the lower surface of the head portion 11, and their lower end portions constitute connection ribs 23 connected to elastic locking members 24a and 24b, which are described below.

In the outer periphery of the shaft portion 21, four elastic locking members 24a and 24b are arranged at a predetermined angular interval of approximately 90 degrees. Of those, a pair of opposing elastic locking members 24a are wide in width, and the remaining pair of opposing elastic locking members 24b are narrow in width. Upper end portions 25 of the elastic locking members 24a and 24b are connected to the head portion 11. The protrusions 22 are substantially situated between the elastic locking members 24a and 24b (see FIG. 8); two portions on both sides of the lower end portion of each of the elastic locking members 24a and 24b are connected to the connection ribs 23 extending as the lower edge portions of the protrusions 22. Slits 32 are defined between the elastic locking members 24a and 24b.

The upper end portions 25 of the elastic locking members 24a and 24b are gradually reduced in width toward the head portion 11, whereby when an external force is applied to any one of the elastic locking members 24a and 24b, not only is it deflected inwardly but also it can be twisted at the upper end portion 25 thereof, which is reduced in width.

Figure 2:
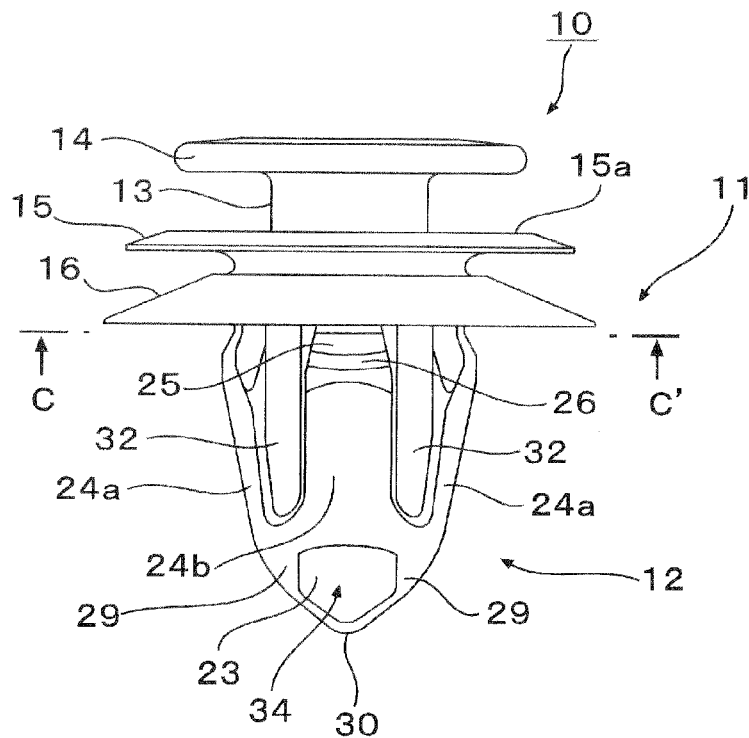
FIG. 2 is a front view of the clip.
Figure 3:
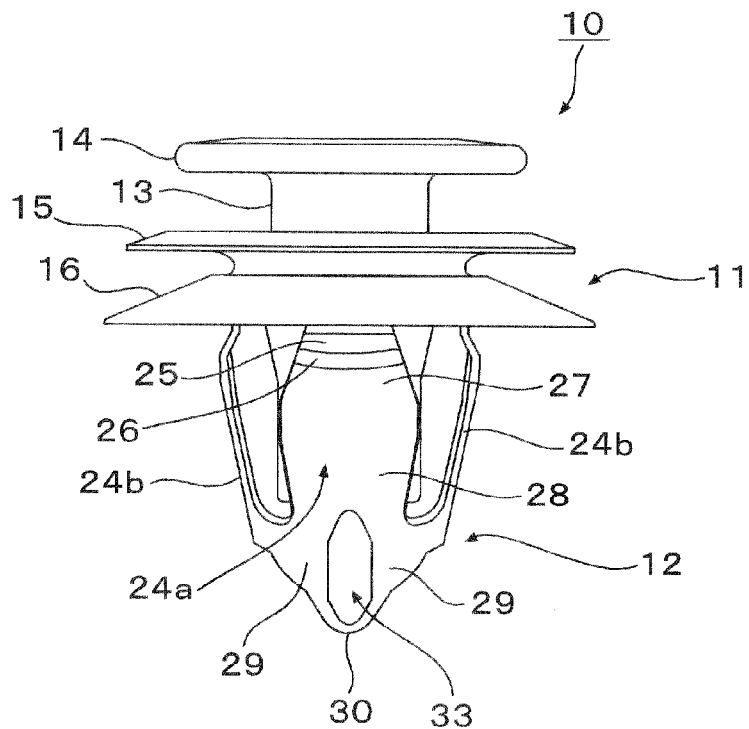
FIG. 3 is a right-hand side view of the clip (which is the same as a left-hand side view thereof)
Figure 4:
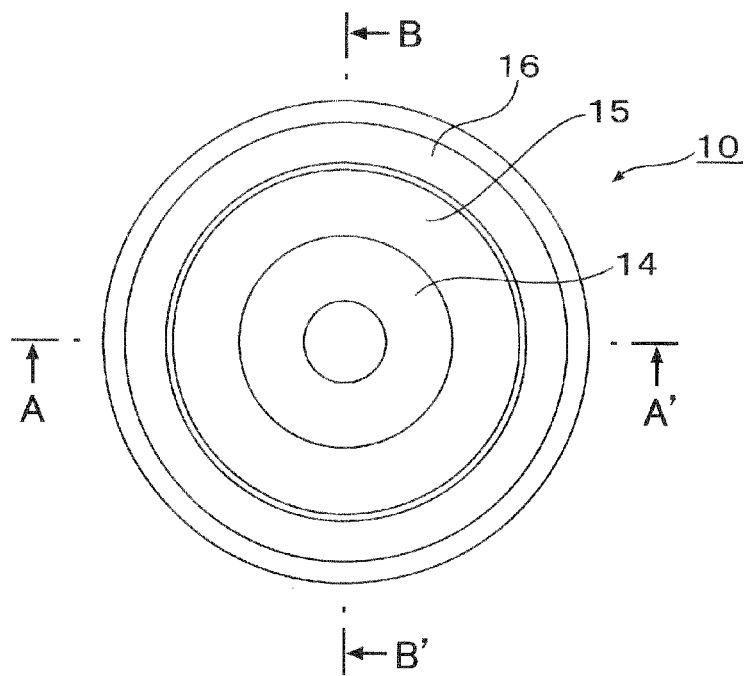
FIG. 4 is a plan view of the clip (which is the same as a rear view thereof)

Referring also to FIGS. 1, 2, and 3, somewhat below the upper end portions of the elastic locking members 24a and 24b, there are formed engagement step portions 26, and diverging portions 27 are provided below the engagement step portions 26. Further, the portions below the diverging portions 27 are formed as tapered portions 28 gradually reduced in diameter. Below the tapered portions 28, the end edges of the connection ribs 23 extend to a lower end portion 30 of the locking leg 12 via connecting portions 29.

In the outer periphery of the lower end portion 30 of the locking leg 12, there are formed four cavities 33 and 34 defined by the elastic locking members 24a and 24b, the connection ribs 23, and the shaft portion 21. Of those, as compared with second cavities 34 situated below the narrower elastic locking members 24b, first cavities 33 situated below the wider elastic locking members 24a are narrower in width and more elongated upwards.

Figure 10:
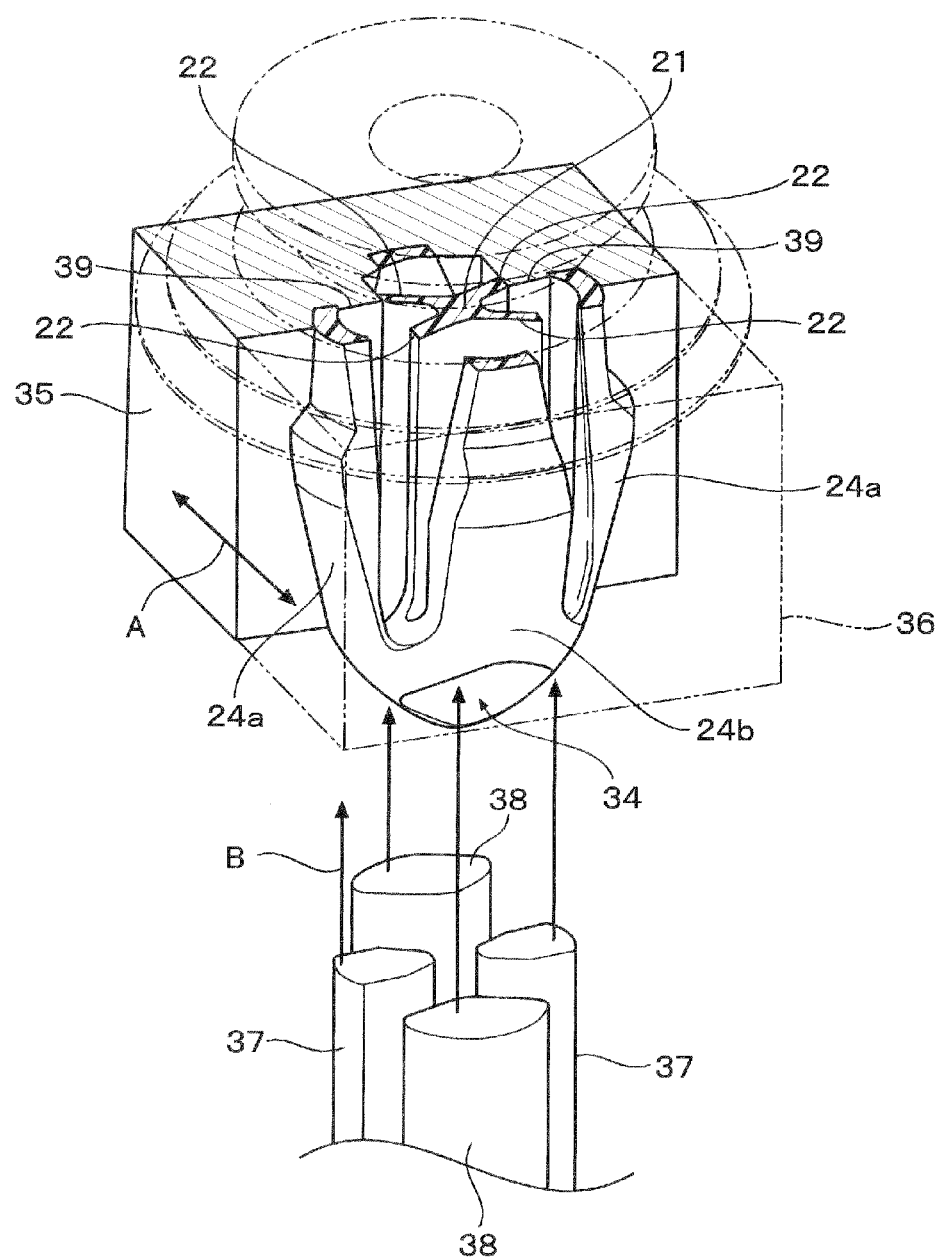
FIG. 10 is an explanatory view of a mold for producing the clip.

FIG. 10 schematically shows the construction of a mold for producing the clip 10. This mold has a pair of dies 35 and 36 adapted to slide in the directions indicated by the arrows A, and a plurality of dies 37 and 38 adapted to be opened and closed in the directions indicated by the arrows B. The pair of dies 35 and 36 have shapes to shape the outer peripheral configuration of the clip 10 and have insertion portions 39 to be inserted to make the gaps between the wider elastic locking members 24a, the shaft portion 21, and the protrusions 22. Of the dies 37 and 38, a pair of opposing dies 37 are inserted to make the inner periphery of the wider elastic locking members 24a, and the remaining pair of opposing dies 38 are inserted to make the inner periphery of the narrower elastic locking members 24b.

Referring also to FIG. 8, it is necessary to provide predetermined gaps S1 between the wider elastic locking members 24a and the protrusions 22 in order to allow insertion of the insertion portions 39 of the dies 35 and 36 and to secure margins sufficient for the elastic locking members 24a to deflect toward the inside. Thus, the thickness t1 of the elastic locking members 24a is required to be relatively small, whereas their width W1 can be made relatively large. On the other hand, the width W2 of the elastic locking members 24b is restricted by the insertion portions 39, so they must be rather narrow. In view of this, in this embodiment, the width W1 of the elastic locking members 24a is made large, the thickness t1 thereof is made small, the width W2 of the elastic locking members 24b is made small, and the thickness t2 thereof is made large. Therefore, their sectional areas are as equal to each other as possible, thus obtaining a substantially uniform deflection rigidity over the entire periphery.

On the other hand, the thickness t2 of the elastic locking members 24b being made large, in order to secure margins sufficient for them to deflect toward the inside, a structure must be provided, that prevents interference with the protrusions 22 as far as possible when the elastic locking members 24b are inwardly deflected. In view of this, in this embodiment, the angle θ1 of the pair of protrusions 22 extending toward each wider elastic locking member 24a is made acute, and the angle θ2 of the pair of protrusions 22 extending toward each narrower elastic locking member 24b is made obtuse. Thus, gaps S2 are secured between the elastic locking members 24b and the protrusions 22, which allows the elastic locking members 24b to be deflected greatly inwards without interfering with the protrusions 22.

Figure 5:
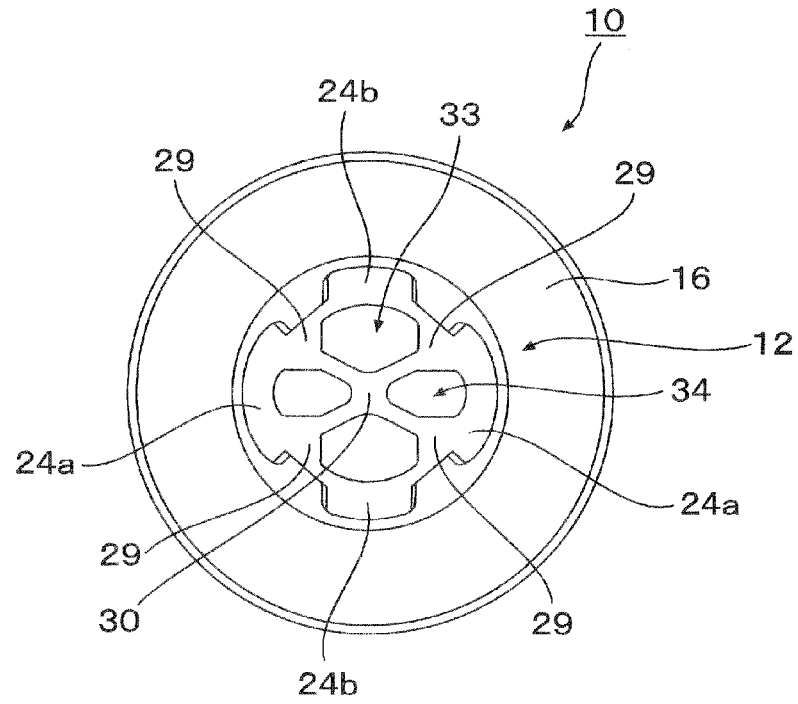
FIG. 5 is a bottom view of the clip.

Further, to make the above-mentioned different angles depending upon the orientations of the protrusions 22, the dies 37, which are inserted to make the spaces exhibiting the acute angle θ1, have a radially thin and long sectional configuration. The dies 38, which are inserted to make the spaces exhibiting the obtuse angle θ2, have a circumferentially wide sectional configuration. As a result, as shown in FIGS. 2, 3, and 5, the first cavities 33, into which the dies 37 are inserted, are narrow and vertically elongated, and the second cavities 34, into which the dies 38 are inserted, are wide and of a relatively small vertical dimension. This provides the following effect. Due to the large interval between the connection ribs 23, the deflection rigidity of the connection ribs 23 situated on both sides of each wide, second cavity 34 can be made relatively low, whereas, due to the small interval between the connection ribs 23, the deflection rigidity of the connection ribs 23 situated on both sides of each narrow, first cavity 33 usually tends to be high. However, in this embodiment, described above, the first cavities 33 are vertically elongated. Therefore, despite the small interval, the deflection rigidity is reduced, which, as a result, contributes to making the deflection rigidity at the connecting portions 29 relatively uniform over the entire periphery.

Figure 9:
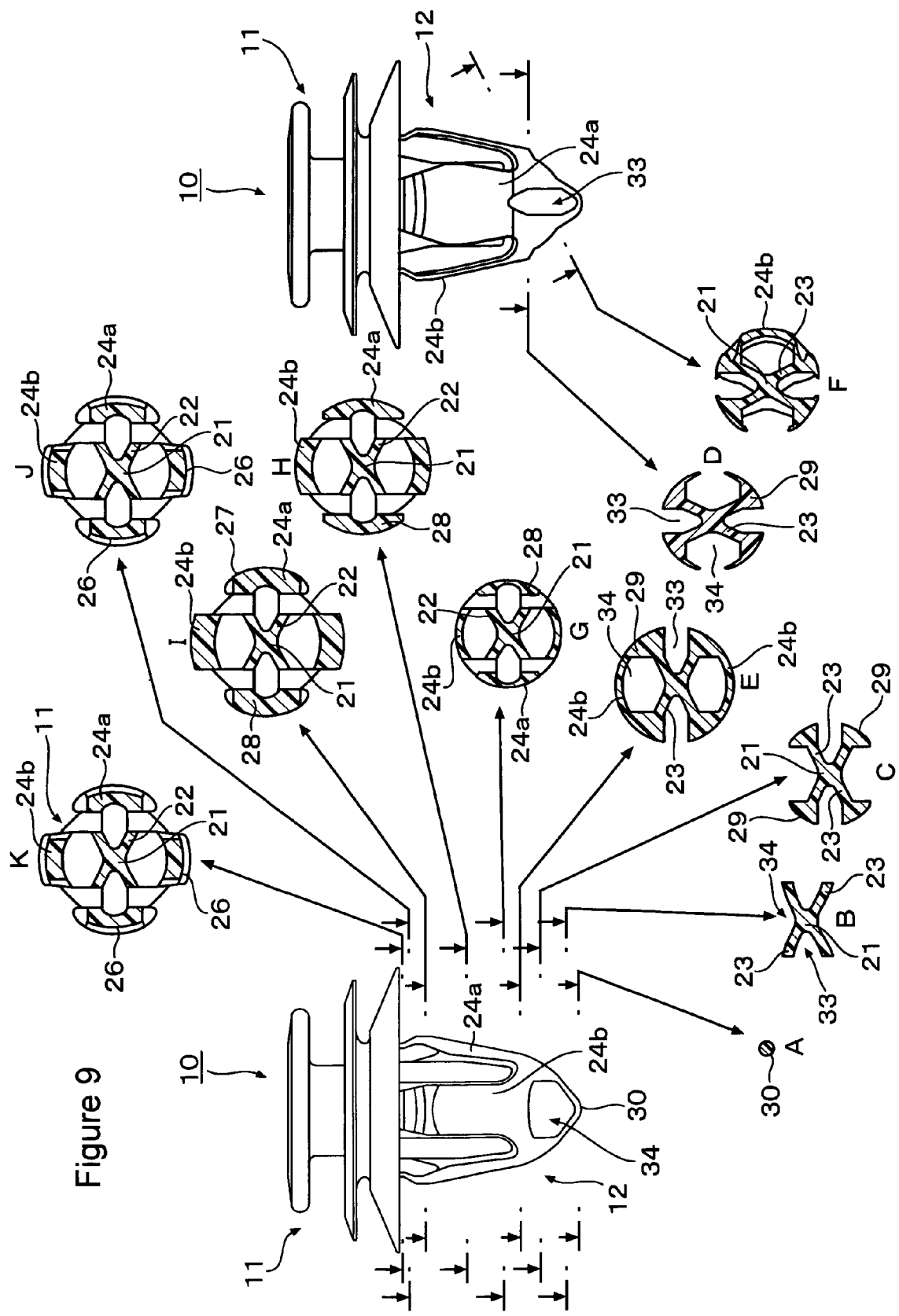
FIG. 9 is an explanatory view showing a locking leg of the clip in sections as taken at various heights.

FIG. 9 shows the clip 10 in sections as taken at various heights and angles; portions A through K of the drawing show sectional configurations obtained at positions indicated by corresponding arrows. As shown in portions A through D of the drawing, the connection ribs 23 extend radially outwards as the locking leg 12 extends upwardly from the lower end portion 30. And, as shown in portions D, E, and F of the drawing, the connection ribs 23 are connected to both side portions of each of the elastic locking members 24a and 24b, and both side portions of each of the elastic locking members 24a and 24b are supported by corresponding connection ribs 23. Further, as shown in portions G, H, and I of the drawing, the outer peripheral diameter of the elastic locking members 24a and 24b increases gradually to form the tapered portions 28 and the diverging portions 27. Further, as shown in portions J and K of the drawing, the elastic locking members 24a and 24b are gradually reduced in diameter to form the engagement step portions 26, and are gradually narrowed toward the head portion 11, with their upper end portions being connected to the lower surface of the head portion 11.

Figure 12:
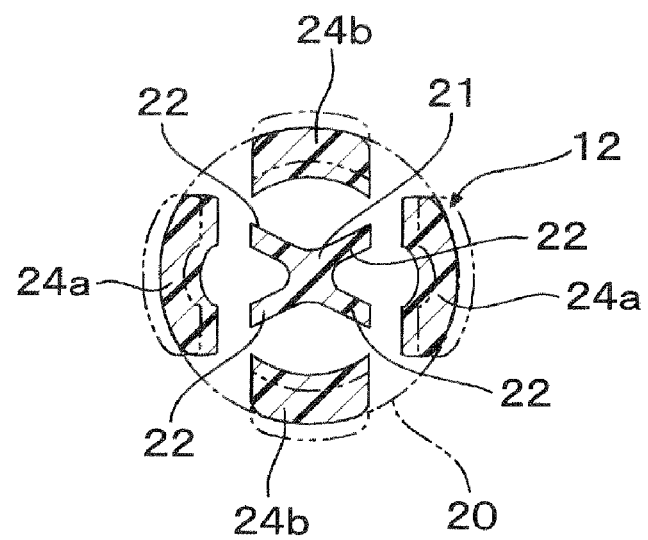
FIG. 12 is a sectional view illustrating how the clip is deflected when inserted into the mounting hole of the mounting panel.

As shown in portions G through K of FIG. 9, the outer periphery of the protrusions 22 of the shaft portion 21 is situated on the inner side of the inner periphery of the elastic locking members 24a and 24b. And, as shown in FIG. 12, if the elastic locking members 24a and 24b are deflected inwardly in order that the locking leg 12 can be inserted into the mounting hole 20 of the mounting panel 19 (see FIG. 11), the elastic locking members 24a and 24b do not come into contact with the protrusions 22 of the shaft portion 21.

Next, the effects of the clip 10 will be described.

As shown in FIG. 11, the base portion 13 between the first flange portion 14 and the second flange portion 15 of the clip 10 is inserted into the engagement groove 18 formed in the mounting member 17 which is formed of an automotive door trim or the like, and the peripheral edge of the engagement groove 18 is held between the first flange portion 14 and the second flange portion 15, thus previously fixing the clip 10 to the mounting member 17.

In this state, the locking leg 12 of the clip 10 is inserted into the mounting hole 20 of the mounting panel 19 which is formed of a body panel or the like. Then, the elastic locking members 24a and 24b are inwardly deflected, and the diverging portions 27 of the locking leg 12 pass through the mounting hole 20; the engagement step portions 26 are engaged with the peripheral edge of the back side of the mounting hole 20 to fix the clip 10 in position, thereby fixing the mounting member 17 to the mounting panel 19.

When passing the locking leg 12 through the mounting hole 20, and if the locking leg 12 has to be inserted obliquely with respect to the mounting hole 20 due to positional deviation between the mounting panel 19 and the mounting member 17, in this clip 10, the presence of the shaft portion 21 prevents the locking leg 12 from buckling, making it possible to insert the locking leg 12 into the mounting hole 20.

As shown in FIG. 12, the elastic locking members 24a and 24b are deflected until their outer periphery reaches the inner periphery of the mounting hole 20; in this state, there are provided gaps large enough to prevent the inner periphery of the elastic locking members 24a and 24b from coming into contact with the protrusions 22 of the shaft portion 21. Thus, if the locking leg 12 has to be inserted obliquely into the mounting hole 20 as stated above, the protrusions 22 do not come into contact with the inner periphery of the mounting hole 20. Therefore, the insertion process does not involve scraping of the protrusions 22, so that the insertion of the locking leg 12 can be effected smoothly.

Figure 13:
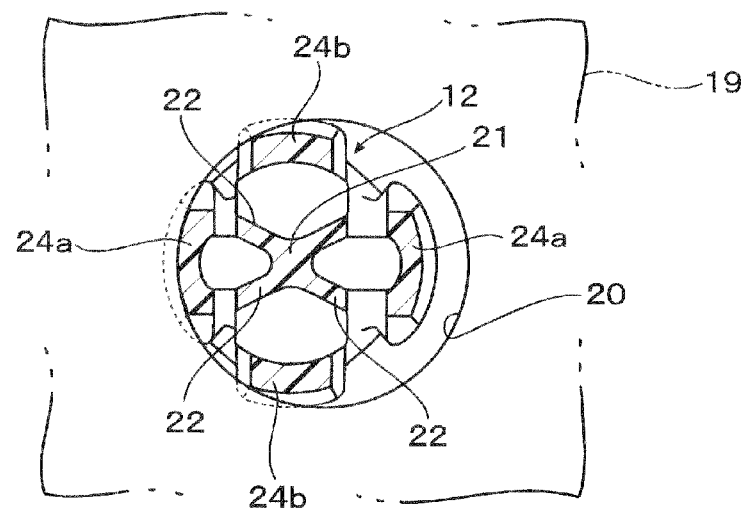
FIG. 13 is a sectional view illustrating how deflection occurs when a load is applied in the direction of wider elastic locking members of the clip in the mounted state.
Figure 14:
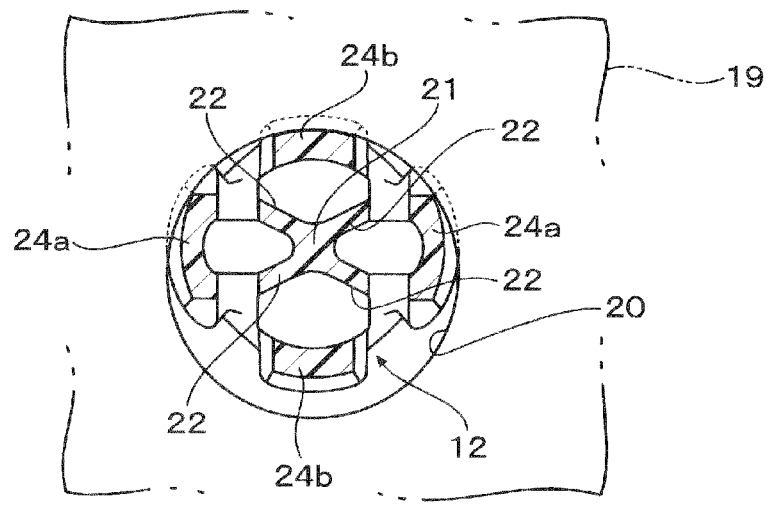
FIG. 14 is a sectional view illustrating how deflection occurs when a load is applied in the direction of narrower elastic locking members of the clip in the mounted state.

FIGS. 13 and 14 show states in which a lateral load due to, for example, a difference in thermal expansion between the mounting member 17 and the mounting panel 19 is applied to the locking leg 12 of the clip 10, with the mounting member 17 being fixed to the mounting panel 19 via the clip 10. FIG. 13 shows a state in which a load is applied in the direction of the wider elastic locking members 24a, and FIG. 14 shows a state in which a load is applied in the direction of the narrower elastic locking members 24b.

If, in FIG. 13, a still larger load is applied, the protrusions 22 of the shaft portion 21 abut the inner periphery of one elastic locking member 24a, and further deformation of the elastic locking member 24a is prevented, thereby avoiding breakage of the clip 10.

In each of the states shown in FIGS. 13 and 14, the inner periphery of the mounting hole 20 obliquely abuts adjacent elastic locking members, and an oblique pressurizing force may be applied thereto; however, in this embodiment, the upper end portions 25 of the elastic locking members 24a and 24b are gradually reduced in width toward the head portion 11, so that the elastic locking members 24a and 24b can be twisted to some degree, thereby enabling being deformed so as to be adapted to the inner periphery of the mounting hole 20.

And, in the clip 10, though the elastic locking members 24a and 24b differ in width, their thickness is adjusted so as to exhibit substantially the same cross-sectional area, whereby it is possible to obtain a substantially uniform deflection rigidity over the entire periphery of the locking leg 12. Further, as described above, also regarding the connecting portions 29 of the elastic locking members 24a and 24b, the first cavities 33 are narrower and more elongated in the height direction than the second cavities 34, whereby it is possible to obtain a substantially uniform deflection rigidity over the entire periphery.

Figure 15:
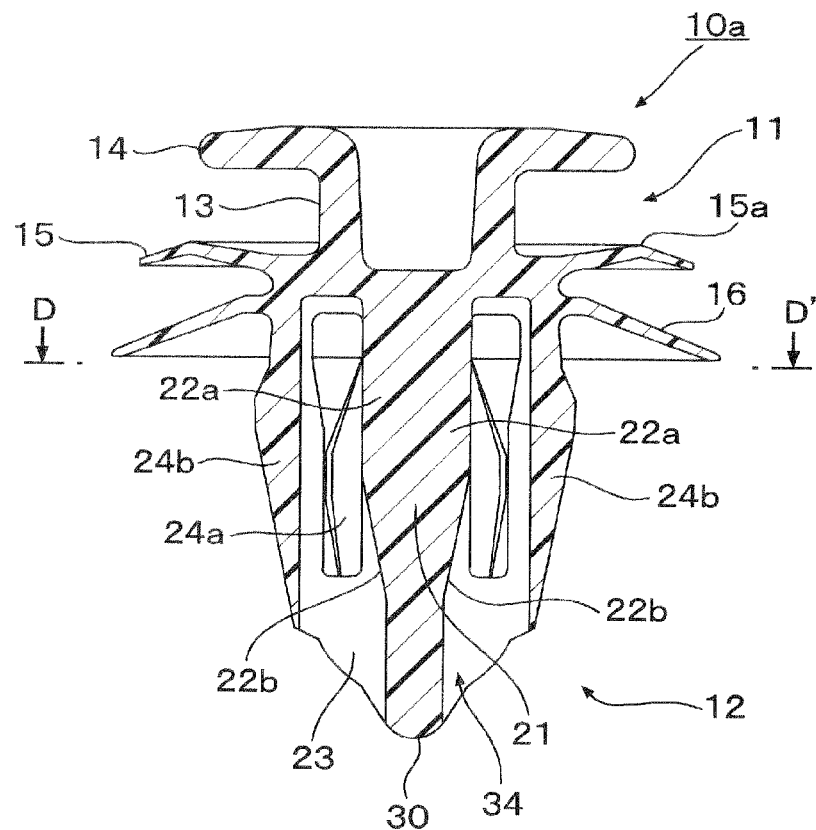
FIG. 15 is a sectional view of a clip according to another embodiment of the present invention.
Figure 16:
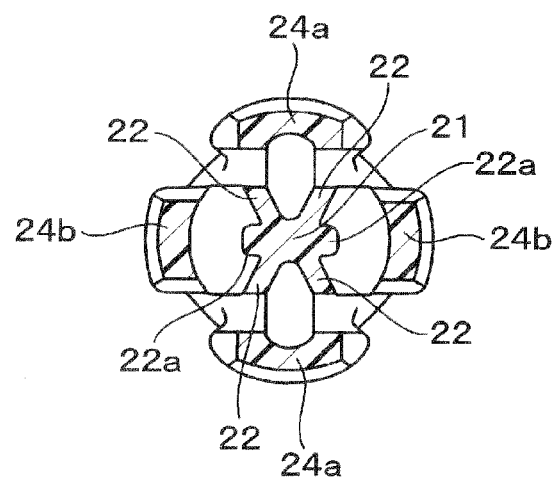
FIG. 16 is a sectional view taken along the arrow line D-D' of FIG. 15.

FIGS. 15 and 16 show a clip according to another embodiment of the present invention. The portions that are substantially the same as those of the above-described embodiment are indicated by the same reference numerals, and a description thereof will be omitted.

In a clip 10a according to this embodiment, rib-like protrusions 22a each protrude between each of the pairs of the protrusions 22 of the shaft portion 21 facing toward the narrower elastic locking members 24b. Referring also to FIG. 15, the rib-like protrusions 22a extend in the axial direction from the lower surface of the head portion 11 in a predetermined height. Starting from an intermediate position in the axial direction of the shaft portion 21, there are formed tapered surfaces 22b gradually reduced in height toward the distal end of the shaft portion 21.

And, in this embodiment, even if a large external force to deflect the narrower elastic locking members 24b is applied to the locking leg 12 in the state in which the clip 10a has been mounted to the mounting hole 20 of the mounting panel 19, the inner periphery of the elastic locking members 24b abuts the rib-like protrusions 22a. Therefore, further deflection thereof is restrained, so it is possible to prevent the situation such as a damage of the elastic locking members 24b, a detachment of the clip 10 from the mounting hole 20 due to extreme deformation, and the like.

What is claimed is:

1. A clip formed of synthetic resin, comprising:
a head portion; and
a locking leg vertically extending from a lower surface of the head portion, the clip being capable of being immovably mounted to a panel by inserting the locking leg into a mounting hole of the panel,
wherein the locking leg comprises:
a shaft portion vertically extending from a center of the lower surface of the head portion; and
at least three elastic locking members which are arranged at given intervals at an outer periphery of the shaft portion, each of the elastic locking members having an upper end which is connected to the lower surface of the head portion, and a lower end including two portions which are respectively provided on two sides thereof and which are respectively connected to the shaft portion via connection ribs extending from the shaft portion,
wherein a connection portion between each of the upper ends of the elastic locking members and the lower surface of the head portion and a connection portion between an upper end of the shaft portion and the lower surface of the head portion are arranged separately such that the upper ends of the elastic members are not directly connected to the shaft portion,
wherein the outer periphery of the shaft portion, except for the connection ribs, is situated on an inner side of an inner periphery of the elastic locking members, and wherein the shaft portion and the elastic locking members are configured such that when the locking leg is inserted into the mounting hole of the panel, the inner periphery of the elastic locking members does not come into contact with the outer periphery of the shaft portion;
wherein the shaft portion comprises protrusions extending along an axial direction thereof, the protrusions being arranged at positions substantially between positions of the elastic locking members;
wherein upper ends of the protrusions are connected to the lower surface of the head portion;
wherein lower ends of the protrusions constitute the connection ribs;

wherein an outer periphery of the protrusions except for the connection ribs is separated from and situated on the inner side of the inner periphery of the elastic locking members;

wherein the at least three elastic locking members comprise four elastic locking members arranged at intervals of approximately 90 degrees with respect to the shaft portion;

wherein, of the four elastic locking members, a pair of the elastic locking members that are opposed to each other are wider in width and thinner in thickness than another pair of the elastic locking members that are opposed to each other; and wherein the protrusions comprise a first pair of protrusions that extend respectively toward two sides of one of the wider elastic locking members, and a second pair of protrusions that extend respectively toward two sides of another of the wider elastic locking members, and wherein each of the first and second pairs of protrusions forms an acute angle.

2. A clip according to claim 1, wherein each of the elastic locking members comprises an upper end portion which is gradually reduced in width toward the head portion and which includes the upper end connected to the lower surface of the head portion.

3. A clip according to claim 1, wherein an outer periphery of a lower end portion of the locking leg comprises four cavities defined by the elastic locking members, the connection ribs, and the shaft portion, and wherein, of the four cavities, cavities provided at the lower ends of the wider elastic locking members are narrower and more elongated upwardly than cavities provided at the lower ends of the narrower elastic locking members.

4. A clip according to claim 1, wherein the shaft portion further comprises rib-like protrusions to restrain excessive deflection of the elastic locking members, the rib-like protrusions being arranged between pairs of the protrusions extending toward the narrower elastic locking members, respectively.

5. A clip according to claim 3, wherein each of the elastic locking members comprises an upper end portion which is gradually reduced in width toward the head portion and which includes the upper end connected to the lower surface of the head portion.

6. A clip according to claim 4, wherein each of the elastic locking members comprises an upper end portion which is gradually reduced in width toward the head portion and which includes the upper end connected to the lower surface of the head portion.

7. A clip according to claim 3, wherein the shaft portion further comprises rib-like protrusions to restrain excessive deflection of the elastic locking members, the rib-like protrusions being arranged between pairs of the protrusions extending toward the narrower elastic locking members, respectively.

8. A clip according to claim 7, wherein each of the elastic locking members comprises an upper end portion which is gradually reduced in width toward the head portion and which includes the upper end connected to the lower surface of the head portion.

9. A clip according to claim 1, wherein the protrusions do not project between the elastic locking members past the inner periphery of the elastic locking members when the locking leg is inserted into the mounting hole of the panel.

10. A clip according to claim 1, wherein the protrusions remain on the inner side of the inner periphery of the elastic locking members when the locking leg is inserted into the mounting hole of the panel.

11. A clip according to claim 1, wherein an outer diameter of the outer periphery of the shaft portion increases toward the connection ribs extending from the shaft portion.

12. A clip formed of synthetic resin, comprising:
a head portion; and
a locking leg vertically extending from a lower surface of the head portion, the clip being capable of being immovably mounted to a panel by inserting the locking leg into a mounting hole of the panel,
wherein the locking leg comprises:
a shaft portion vertically extending from a center of the lower surface of the head portion; and
at least three elastic locking members which are arranged at given intervals at an outer periphery of the shaft portion, each of the elastic locking members having an upper end which is connected to the lower surface of the head portion, and a lower end including two portions which are respectively provided on two sides thereof and which are respectively connected to the shaft portion via connection ribs extending from the shaft portion,
wherein the shaft portion comprises protrusions extending along an axial direction thereof,
wherein upper ends of the protrusions are connected to the lower surface of the head portion,
wherein lower ends of the protrusions constitute the connection ribs, and
wherein a connection portion between each of the upper ends of the elastic locking members and the lower surface of the head portion and a connection portion between each of the upper ends of the protrusions and the lower surface of the head portion are arranged separately such that the upper ends of the elastic members are not directly connected to the protrusions; and
wherein the outer periphery of the shaft portion including the protrusions, except for the connection ribs, is separated from and situated on an inner side of an inner periphery of the elastic locking members, and wherein the shaft portion and the elastic locking members are configured such that when the locking leg is inserted into the mounting hole of the panel, the inner periphery of the elastic locking members does not come into contact with the outer periphery of the shaft portion including the protrusions.

* * * * *